May 12, 1970    R. K. STRASEL    3,511,035
LIFT MEANS FOR TRACTOR-MOUNTED LAWN MOWERS
Filed Oct. 18, 1968    10 Sheets-Sheet 1

INVENTOR
RAYMOND K. STRASEL
BY: *Arthur J. Hausmann*
ATTORNEY

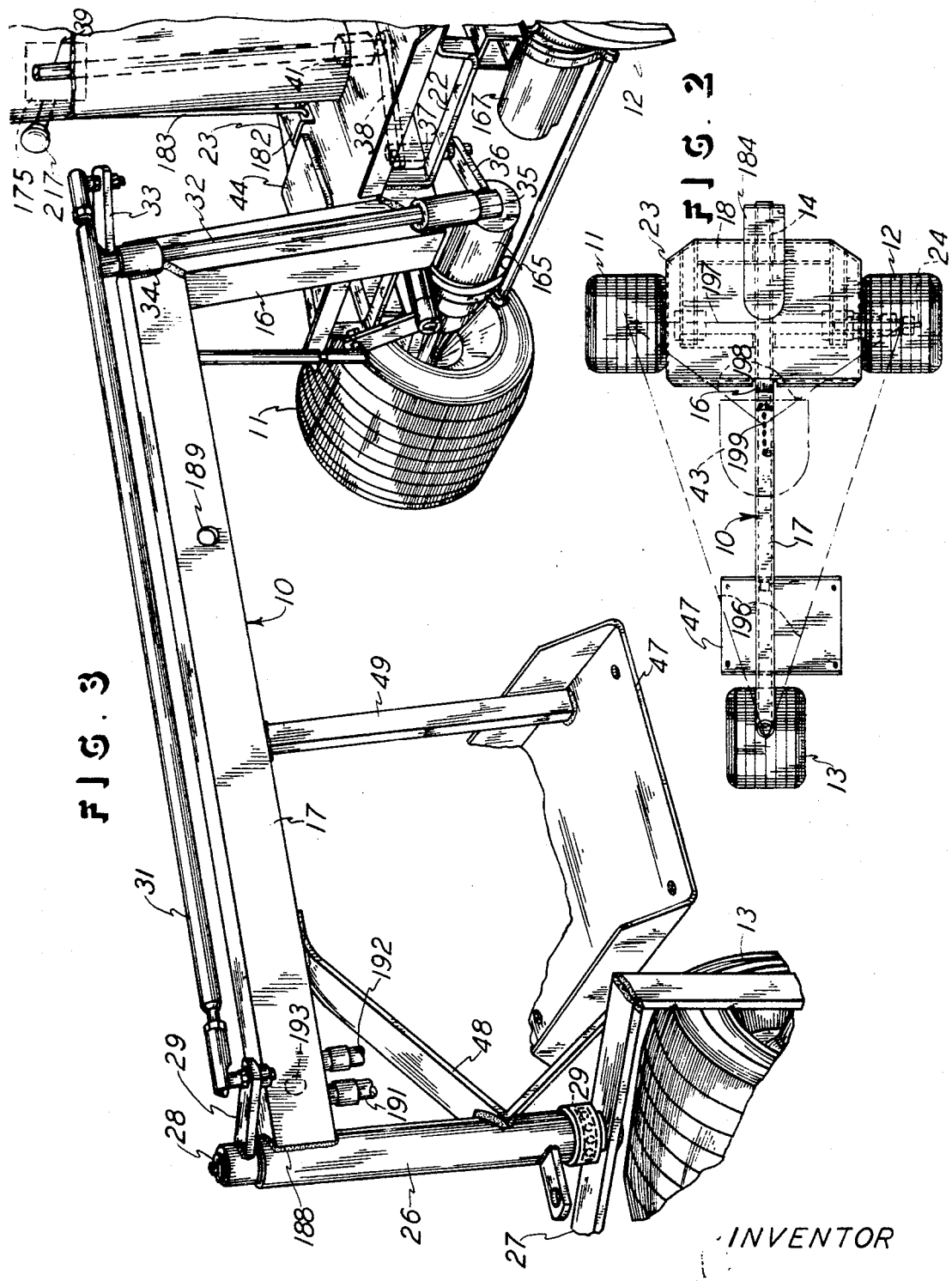

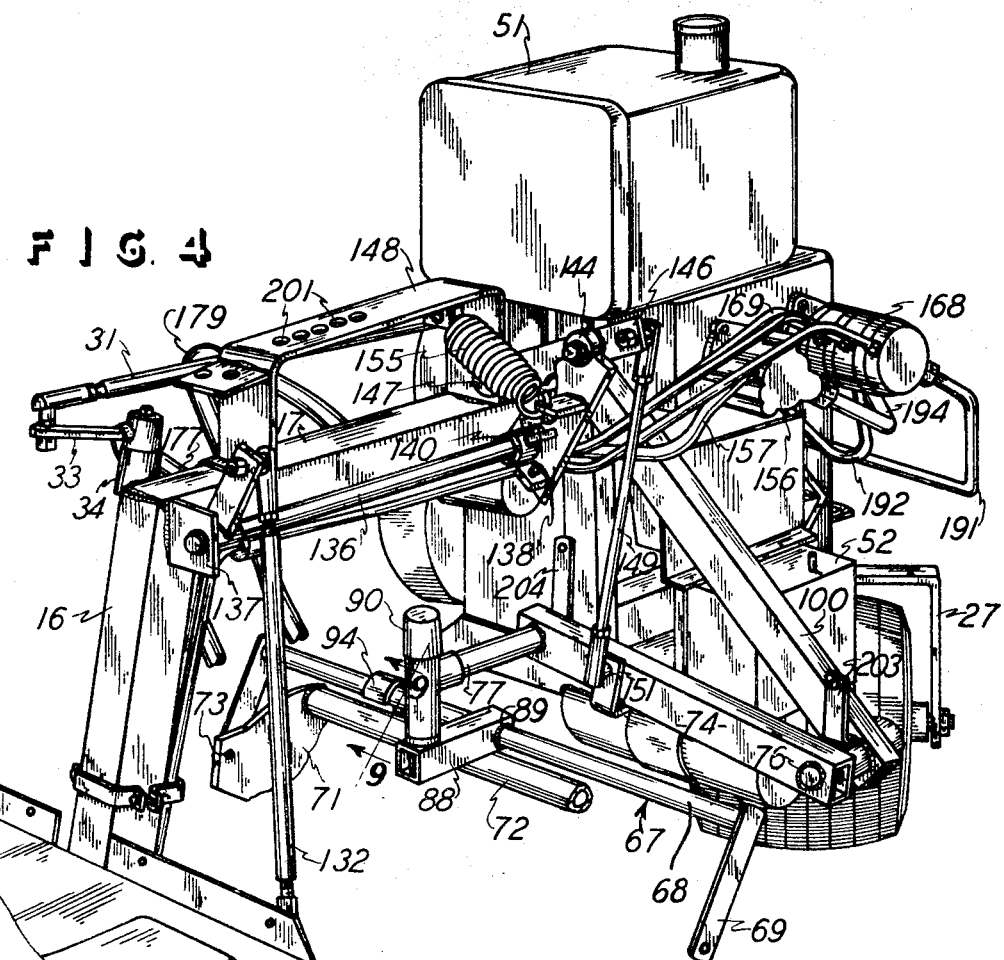
FIG. 4
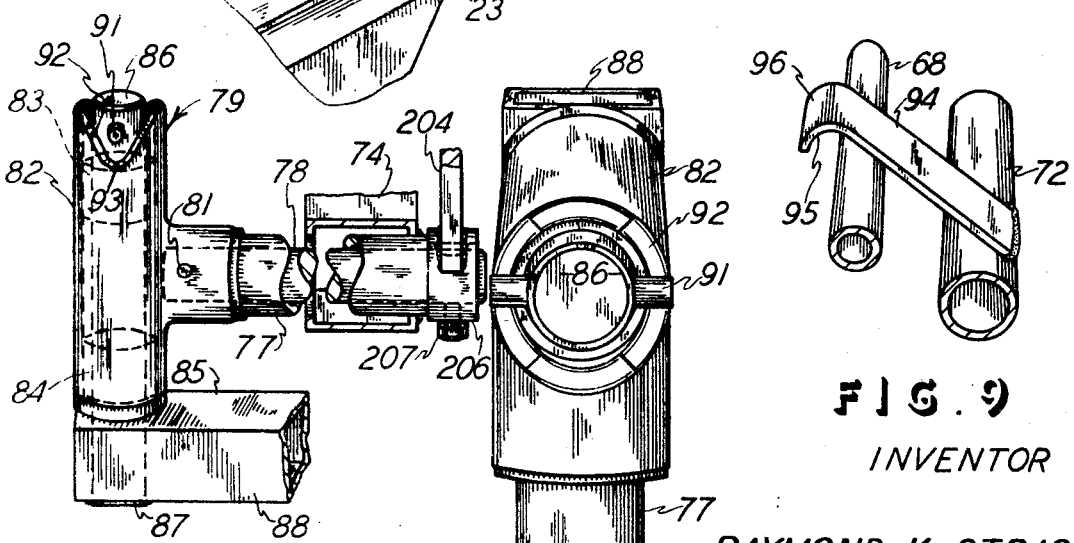
FIG. 7
FIG. 8
FIG. 9
INVENTOR
RAYMOND K. STRASEL
BY: *Arthur J. Hansmann*
ATTORNEY

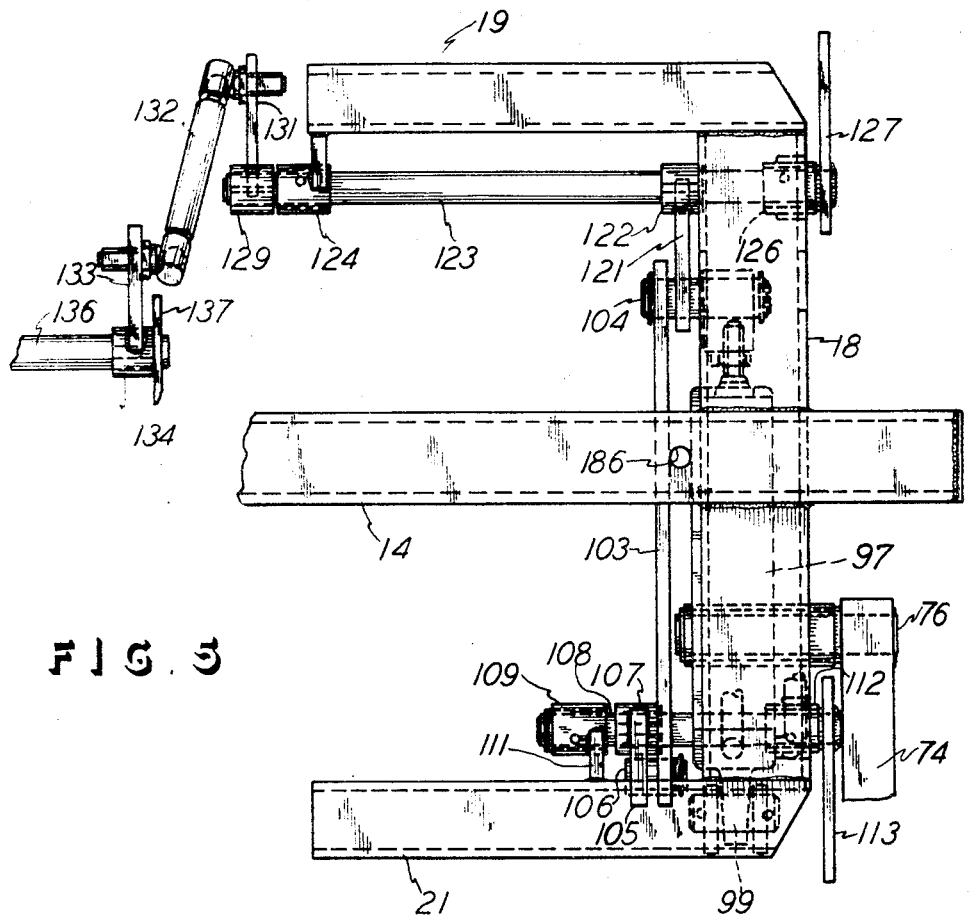

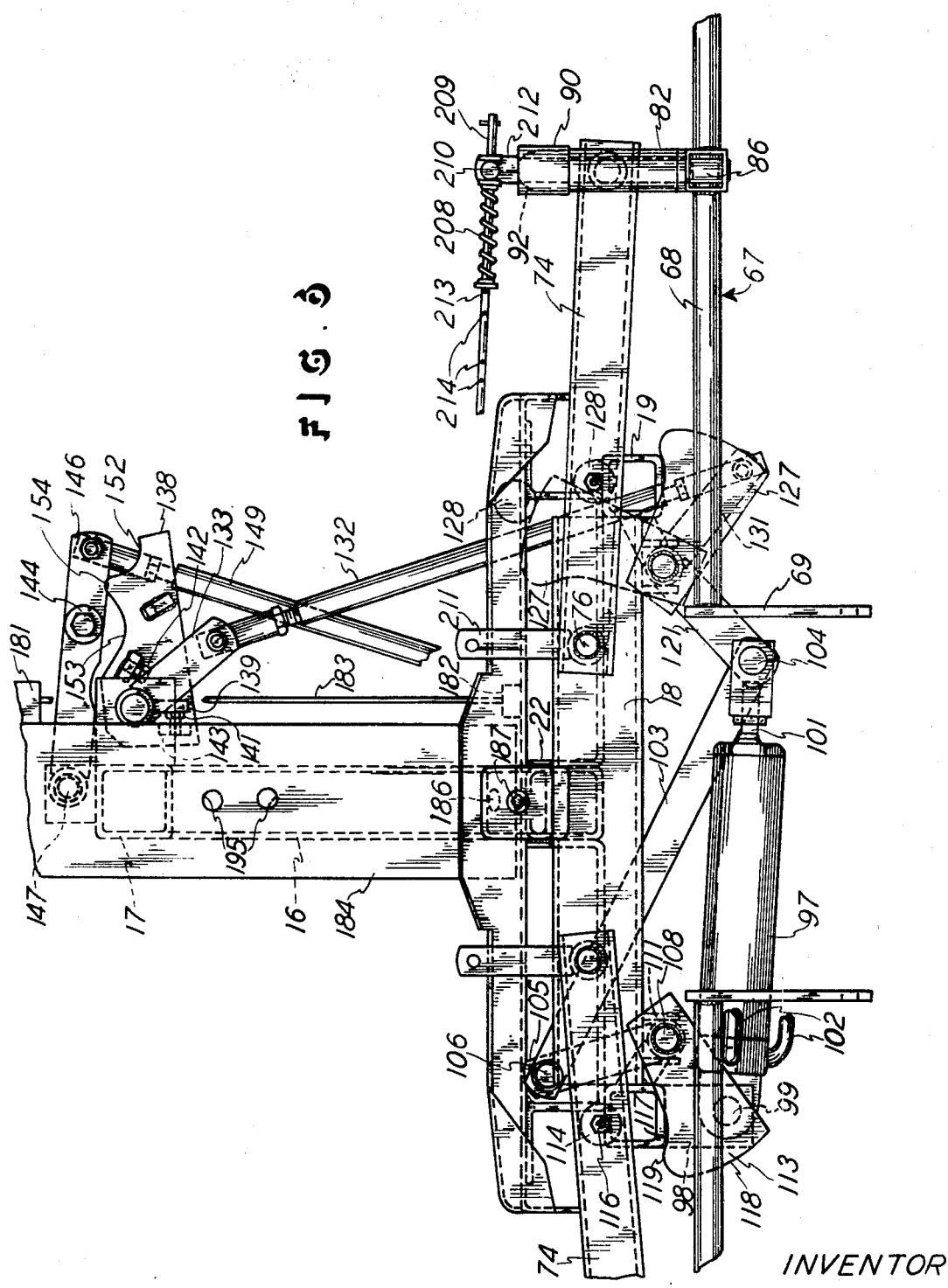

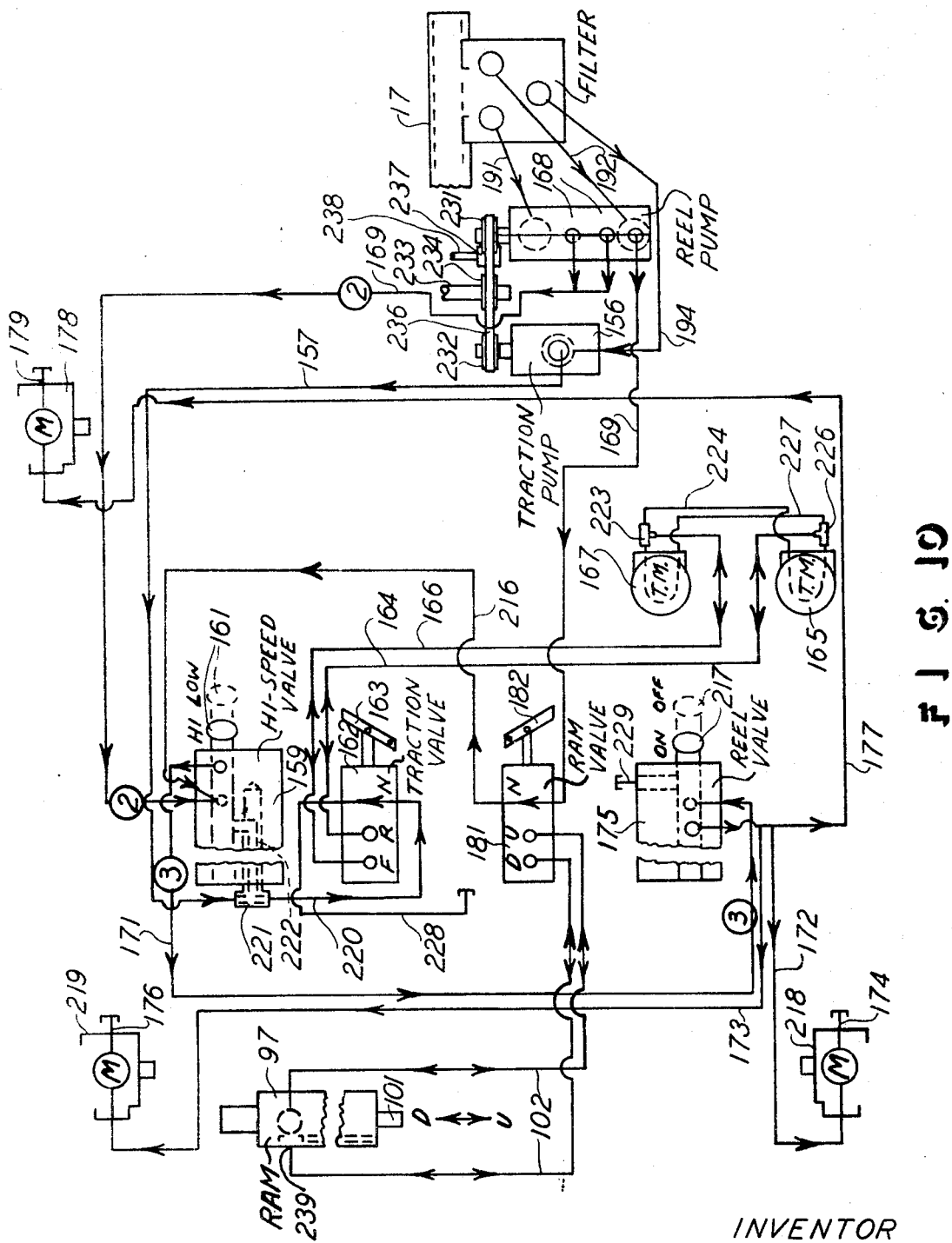

May 12, 1970 R. K. STRASEL 3,511,035
LIFT MEANS FOR TRACTOR-MOUNTED LAWN MOWERS
Filed Oct. 18, 1968 10 Sheets-Sheet 7

INVENTOR:
RAYMOND K. STRASEL
BY: Arthur J. Hansmann
ATTORNEY

May 12, 1970  R. K. STRASEL  3,511,035
LIFT MEANS FOR TRACTOR-MOUNTED LAWN MOWERS
Filed Oct. 18, 1968  10 Sheets-Sheet 8

INVENTOR:
RAYMOND K. STRASEL

BY *Arthur J. Hansmann*
ATTORNEY

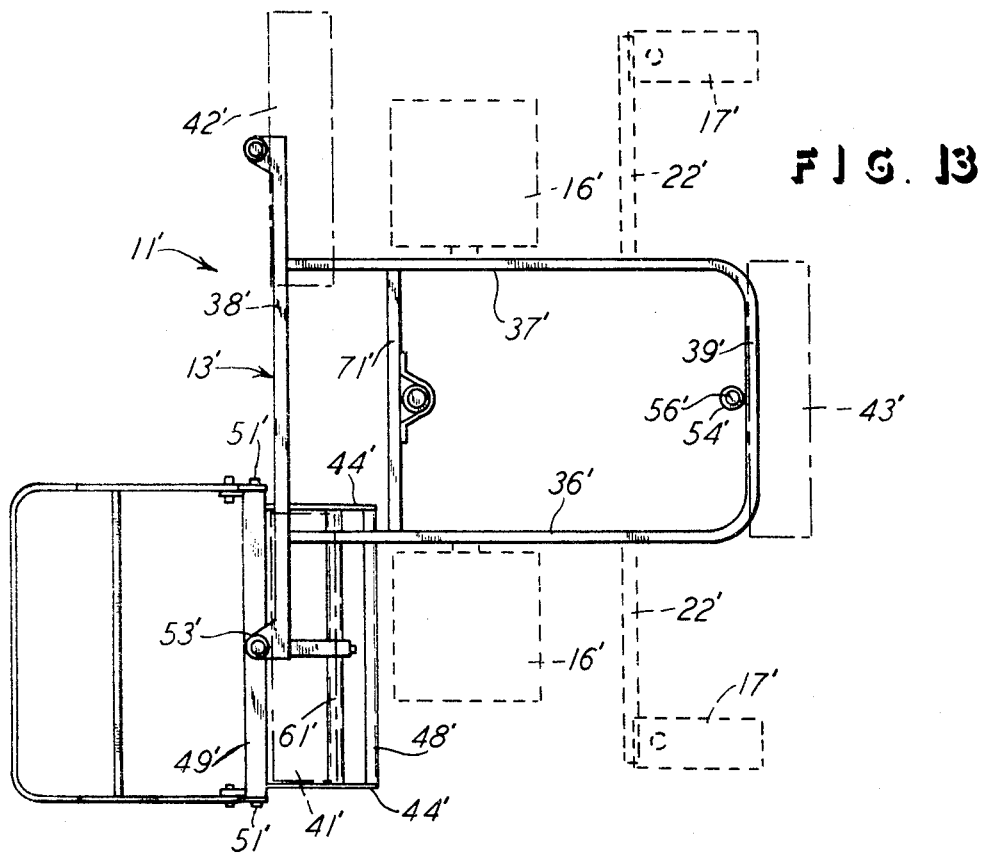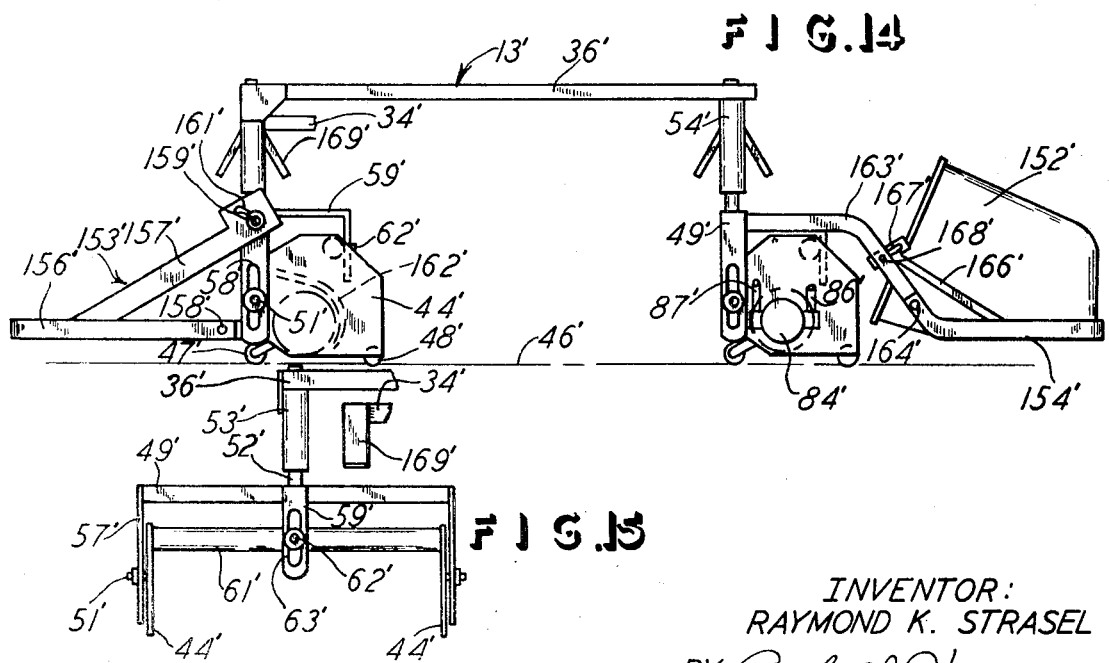

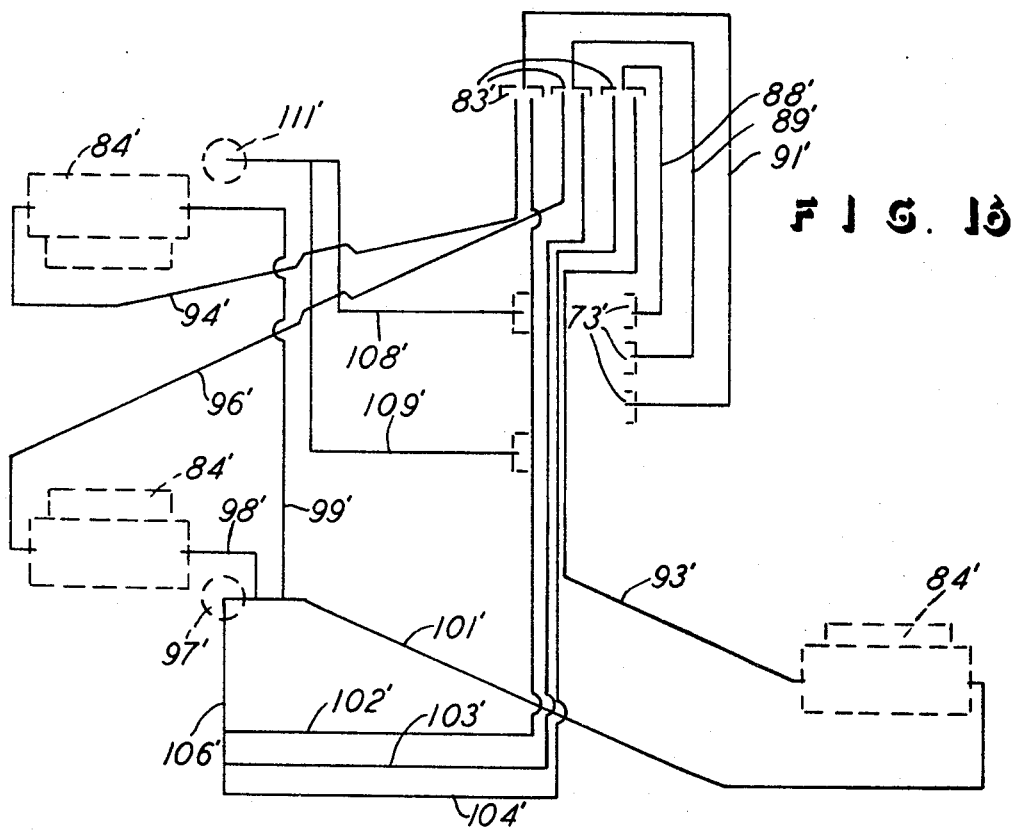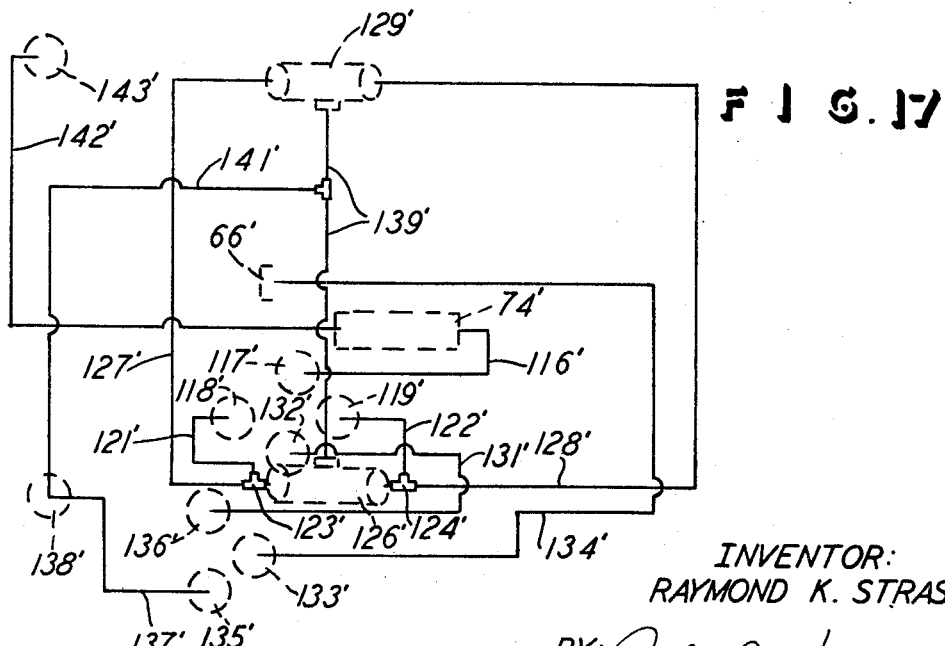

3,511,035
LIFT MEANS FOR TRACTOR-MOUNTED
LAWN MOWERS
Raymond K. Strasel, Winthrop Harbor, Ill., assignor to Jacobsen Manufacturing Company, Racine, Wis., a corporation of Wisconsin
Continuation-in-part of application Ser. No. 478,049, Aug. 9, 1965. This application Oct. 18, 1968, Ser. No. 768,650
Int. Cl. A01d 75/30
U.S. Cl. 56—7                                 14 Claims

ABSTRACT OF THE DISCLOSURE

A lift means on a tractor and having a lift arm pivotally mounted on the tractor and with the lift arm having a mower supported on the extending end of the arm. The lift means is normally free so that the mower can move up and down in response to undulations on the ground during the mowing process, and the lift means has a set or over-center position for securely holding the lift arm and the mower in the raised or transport position. The unit is shown with a plurality of mowers, with each having its own lift arm, and with some of the mowers being rearwardly mounted on the tractor with respect to the other mowers. Connecting means then extend between the mowers so that the forwardly mounted mowers and the rearwardly mounted mowers can be raised and lowered at different times, if desired. Further, adjustment means are provided for governing the difference in the time between the raising and lowering mentioned. Still further, the raising and lowering is relative to the forward speed of the tractor so that the mowers can be accurately controlled.

BACKGROUND OF THE INVENTION

This is a continuation-in-part of U.S. patent application No. 478,049 filed Aug. 9, 1965, and now U.S. Pat. No. 3,429,110.

This invention relates to a lift means for tractor mounted mowers. The prior art contains many examples of a gang of lawn mowers mounted on a tractor, and lift means are commonly employed for raising the mowers from a mowing position to a transport position. Still further, the prior art lift means commonly provide for the floating action or the up-and-down motion of the mowers to permit the mowers to adjust to irregularities or undulations in the ground while mowing. Prior art mowers are also mounted on tractors to be raised to the transport position, where they are held in a relatively secure manner so that they will not swing and damage themselves or tractor parts around them. The prior art also shows mowers which are of the caster type and are without wheels.

The purposes of the present invention are to provide a lift means for tractor-mounted lawn mowers wherein the mowers are completely free to follow the irregularities on the ground in the mowing position, the mowers are held in a secure transport position, the mowers are accurately guided along the ground, the mowers are without wheels, they are caster mounted mowers, and there is a plurality of mowers on one tractor though only one common power unit is utilized for lifting all of the mowers.

Still further, the lift means of this invention is arranged to be operative on the plurality of mowers which are forwardly and rearwardly located on a tractor, and the lift means operates on these mowers at different times so that all of the mowers are not raised and lowered at the same time. That is, all the mowers can be raised off, and lowered onto, the ground along the same line across which the tractor is moving, and such is accomplished by raising the front mowers when they reach that line and then raising the rear mowers off that line when they reach that same line as the tractor is advancing.

Still further, it is significant that the mowers are held in the transport position and by the lift means without requiring that the power be on so the lift unit is energized at the time that the mowers are in the fully supported or transport position. This object is accomplished by the feature of an over-center arrangement with the lifting mechanism.

Still further, the lift mechanism is arranged such that when the mowers are lowered onto the ground, the lowering action is cushioned so that the mowers do not damage themselves or the turf.

Also, the mowers are raised and lowered relative to the forward speed of the tractor, and with delayed action.

This invention is particularly applicable to tractor-mounted lawn mowers for mowing golf course greens, and here the arcuate and careful raising and lowering of the mowers is required, and special mower mountings and special types of mowers, such as the wheelless mowers, are required. This invention therefore recognizes this concern and provides the structure to accomplish these desired results.

BRIEF DESCRIPTION OF THE DRAWING

FIG. 2 is a top plan view of certain parts of FIG. 1.

FIG. 3 is a rear perspective view of a fragment of FIG. 1.

FIG. 4 is a front perspective view of the rear fragment of FIG. 1.

FIG. 5 is a top plan view of certain parts of FIG. 1.

FIG. 6 is a front elevational view of certain parts of FIG. 1.

FIG. 7 is a side perspective view of certain parts of FIG. 1.

FIG. 8 is a top perspective view of FIG. 7.

FIG. 9 is a sectional view taken on the line 9—9 of FIG. 4, and showing the parts in a slightly different position.

FIG. 10 is a schematic view of the hydraulic system for the embodiment shown in FIG. 1.

FIG. 13 is a top plan view of a fragment of the embodiment shown in FIG. 11, and with the mowers shown in dot-dash lines and with portions of the tractor unit shown in dotted lines.

FIG. 14 is a side elevational view of FIG. 13 with parts omitted and added.

FIG. 15 is a rear elevational view of a fragment of FIG. 14, and particularly showing the mower frame and the connecting fork.

FIGS. 16 and 17 are schematic views of the hydraulic systems employed in the FIG. 11 embodiment.

DETAILED DESCRIPTION OF THE PREFERRED EMBODIMENT

Figure 1:
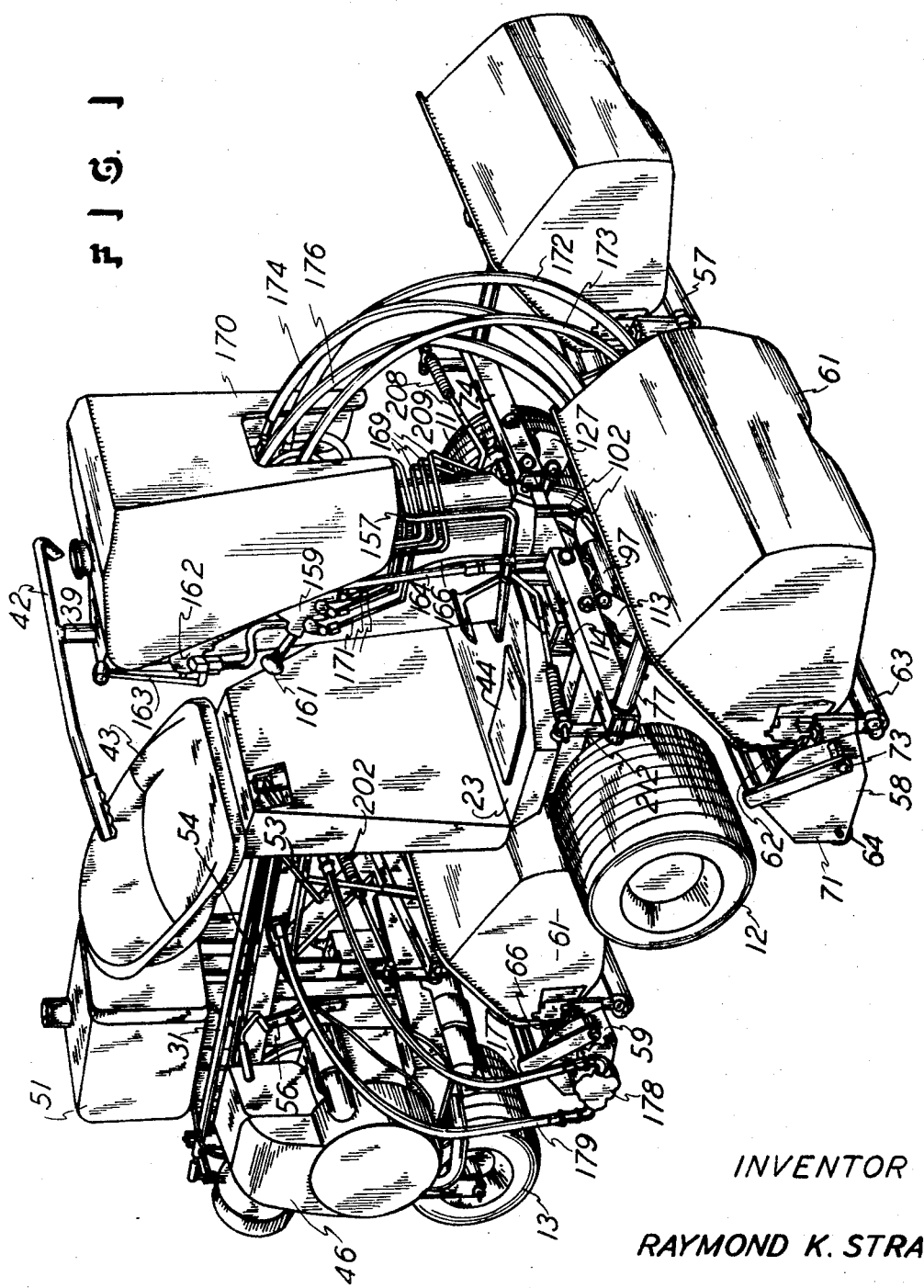
FIG. 1 is a front perspective view of one embodiment of this invention.

The embodiment shown in FIGS. 1–10 generally shows a tractor having a frame generally designated 10 and supported on three pneumatic wheels 11, 12, and 13. Wheels 11 and 12 are forwardly located on the frame 10 and they are traction wheels, and wheel 13 is the rear wheel and it is a steering wheel. The frame 10 includes longitudinally disposed hollow tubular pieces 14, 16, and 17. These three pieces are assembled and welded together as shown, and they extend in the fore-and-aft direction of the tractor and along the central plane thereof. Included as part of the frame is a cross tube 18 which is suitably affixed to the forward end of the tube 14. Side frame tubes 19 and 21 are affixed to the cross tube 18. Also, a brace 22 is seen in FIG. 3 to be connected between the piece 14 and the rear ends of each of the side tubes 19 and 21. The frame pieces described support the platform or operator's station 23 which is suitably affixed to the frame 10 and extends thereover as shown in FIG. 2.

FIG. 2 also shows that the frame 10 supports the front wheel axles 24, for rotatable support of the front wheels 11 and 12. FIG. 3 shows that the frame includes an uprightly disposed sleeve 26 which is affixed to the rear end of the frame piece 17 for supporting the rear wheel 13. Thus the rear wheel 13 has a yoke 27 which serves to suitably rotatably mount the rear wheel 13, and the yoke is affixed to an upstanding post 28 which extends upwardly through the sleeve 26. A ball bearing 29 is disposed between the sleeve 26 and the post 28 to provide adequate rotational and thrust support for the rear end of the tractor with respect to its rear wheel 13.

At this point it will also be noted that the post 28 is rotatable in the sleeve 26 by means of steering linkage which includes an arm 29 affixed to the steering post 28. A link 31 pivotally connects to the arm 29 and extends along the frame piece 17 as shown. Another steering link 32 is pivotally connected to the link 31 by means of an arm 33 being affixed to the link 32 and with the forward end of the link 31 being pivotally connected to the arm 33. Supporting journals 34 and 35 are affixed to the frame for rotatably supporting the link 32 which has an arm 36 affixed and extending therefrom to connect to a link 37 which is connected to a link 38 which is affixed to the steering column 39. The column 39 may be rotatably mounted in a bushing 41 such that rotation of the column 39 about its upright axis will cause pivotal motion of the links 38 and 37, and the arm 36 will then pivot to rotate the link 32 and longitudinally displace the link 31 to steer the rear wheel 13, as desired. FIG. 1 shows that the upper end of the steering column 39 has a steering control or handle bars 42 affixed thereto.

FIG. 1 shows three reel-type lawn mowers 57, 58, and 59 supported on the tractor, and the mowers 57 and 58 are aligned with and directly in front of the front wheels 11 and 12, respectively, and the mower 59 is rearwardly mounted and is aligned with and directly in front of the rear wheel 13. Thus the mowers are arranged and are of a width which will permit them to mow the grass before the wheels reach the portion of the grass which each mower is cutting.

Of course it will be understood that the three mowers 57, 58 and 59 are of a uniform or common length, say 22 inch length, and they have sufficient overlap to provide for complete mowing across the width of the tractor even though the mowers are adjusting to the irregularities in the ground and even though they may be turned at steering angles. Nevertheless, the entire mowing swath is 62 inches, as mentioned. Thus the individual mowers are short enough to follow the irregularities in the ground in a manner to produce close cutting of the grass, and the aforementioned features are also accomplished.

Each mower has a grass catcher 61 removably mounted on each mower and being fully supported on the mower. Thus it will be understood that the mowers are all of the forward discharging type so that the grass clippings are thrown forwardly, by means of the commonly provided curved baffles 62 on the mowers, and the clippings are thus deposited in the respective catchers 61. Also, it is significant to notice that the rear mower 59 and its catcher 61 are located in a space adequate for easily accommodating the mower and its catcher so that there is access to the mower 59 and so that the catcher 61 can be readily removed from the mower 59 for emptying the grass and the like. That is, the tractor, particularly the tractor frame 10, is arranged so that there is adequate space for the rear mower and its catcher, as clearly shown in FIGS. 1, 3, and 4. Further, the mowers are all of the type which do not utilize ground wheels, but instead they have forwardly and rearwardly mounted rollers 63 and 64. These reel-type mowers all each have their usual cutting reels 66, one of which is partly shown on the rear mower 59.

FIGS. 1, 4, and 6 show that each of the mowers has a pivotal mounting or support member 67 in the form of a yoke having a cross-tube 68 and affixed end arms 69. A side plate 71 is pivotally mounted on each of the arms 69, and it carries the mower proper by having the mower cross-tube 72 affixed to the plates 71 on each of the mowers. In this manner, the mounting member 67 is a pivotal-type mounting, and the mower is thus capable of pivoting about pins 73 which connect between the arms 69 and the plates 71. Thus the mower is free to pivot about an axis parallel to the longituринal axis of the mower reel 66, as the rollers 63 and 64 adjust themselves to the irregularities in the ground on which the mower is riding.

Each of the three mowers has a pivot or lift arm connected to it for raising and lowering the mowers between a lowered operating position on the ground and a raised transport position. The three mowers have identical lift arms which form a portion of the attachment means, so only one need be described. Of course the pivot arms for the two front mowers 57 and 58 are simply reversed, as seen in FIG. 1, but they are otherwise the same and are similar to the lift arm and attachment means for the rear mower 59, as shown in FIG. 4.

Each mower has a pivot arm 74 which is pivoted on the tractor frame through a pin 76 supported on the frame 10. Each arm 74 has a forwardly extending sleeve 77 affixed thereto, and the sleeve encloses a shaft 78, as shown in FIG. 7. The forward ends of each shaft 78 has a T-shaped cast piece 79 affixed thereto by means of a pin 81 extending through the piece 79 and the shaft 78. The piece 79 has a sleeve portion 82 containing an upper bushing 83 and a lower bushing 84 which slidably and rotatably receive a post or pin 86 in a lost motion connection described hereinafter. The lower end of the pin 86 is welded at 87 to an arm 88 which extends rearwardly to the pivot mounting tube 68, and the two are affixed by means of welding at 89. With this construction, certain raising and lowering of the pivot arm 74 about its pivot pin 76 will raise and lower the mower. That is, the upright post or shaft 86 has a pin 91 extending diametrically thereacross and beyond both sides of the post 86, as shown in FIG. 8. The pin 91 comes into abutment with the upper edge of the sleeve portion 82 of the member 79 when the attachment means assembly of the lift arm 74, sleeve 77, shaft 78, and piece 79 is raised. Still further, the mower is steerable or pivotal about the upright axis extending longitudinally of the post or shaft 86, and thus the mower can track and steer with respect to the steering of the tractor, and the mower will therefore not scuff the turf and it will instead operate in a directly forward position, as the mounting is in the nature of a caster connection between the tractor and the mower. The shaft and sleeve arrangement of pieces 82 and 86 is thus located forwardly of each of the mowers for the castering or steering action mentioned. Also, the arm 88 presents an abutment surface 85 which interferes with the downward motion of the sleeve 82.

Further, the upper edge of the sleeve 82 is shown to have two V-grooves 92 which present abutment surfaces with respect to the circumference or abutment surfaces of the two ends of the pin 91. The V-grooves 92 and the pin 91 therefore restrict the turning or steering angles of each of the mowers, and such restriction is to a maximum of approximately 30-degrees of turning or steering action. Further, when the mowers are raised as described, then the pin 91 engages the abutment surfaces or top edges of the V-grooves 92 as the pins are permitted to move downwardly to the base or apex 93 of the V-grooves 92. This action aligns the mowers with the tractor when the mowers are in the raised or transport position. Therefore, the V-grooves 92 and the pins 91 are themselves oriented or aligned with the tractor for the purpose of aligning the mowers when they are in the raised position, as well as for the purpose of permitting the mowers to steer, but only a limited angle, as described. FIG. 4 shows a cap 90 on the upper end of the sleeve 82.

With regard to raising the mowers, FIG. 9 shows that the pivot mounting tube 68 is in the path of a hook-shaped bracket 94 which is affixed to the mower cross-tube 72. This arrangement therefore permits the pivoting of the mower on its pivot mounting and about the axis defined by the pins 73 at the ends of the arms 69. However, when the mower is raised by lifting the arm 88 and its affixed cross-tube 68 to a sufficient height, then the lift surface 95 on the hook end 96 of the bracket 94 will engage the tube 68 to prevent further pivoting of the mower and will therefore permit lifting of the mower. This is in the nature of a lost-motion connection at the rear of the mower.

The pivot pin 76 for the front mowers 57 and 58 is on the frame crosspiece 18 while the pivot pins 76 for the rear mower 59 is on an arm 100 extending downwardly from and affixed to the frame piece 17. FIGS. 5 and 6 show the mechanism for pivoting the lift arms 74 for the front mowers 57 and 58. Thus a hydraulic cylinder 97 is pivotally mounted on ears 98 on the frame 10 and the ears 98 hold a pivot pin 99 for the cylinder 97. A cylinder ram 101 is extendable from the cylinder 97 when hydraulic pressure is controlled with respect to the cylinder and by means of the hydraulic hoses 102 connected to the cylinder 97. A link 103 is pivoted to a pin 104 at the end of the ram 101, and the link pivotally connects to an arm 105 through a pin 106. The arm 105 is affixed to a sleeve 107 which in turn is affixed to a shaft 108. The shaft 108 is rotatably mounted in a journal 109 supported on an arm 111 connected to the frame piece 21 of the tractor. Another journal 112 is affixed to the frame piece 18, and the journal 112 also rotatably supports the shaft 108. A plate 113 is affixed to the forward end of the shaft 108 so that the plate 113 will rotate with the rotation of the shaft 108. Thus, upon projection of the ram 101, the link 103 and the arm 105 are displaced to rotate the shaft 108 and likewise rotate the plate 113. Upon rotating the plate 113 upwardly, the plate 113 engages a projection or roller 114 mounted on the lift arm 74. Consequently, the arm 74 is caused to pivot upwardly and thereby raise the mower. The roller 114 is shown rotatably mounted on the arm 74 by means of a bolt 116, and the roller 114 is on the rear side of the arm 74 and of course in the path of upright pivotal movement of the plate 113. Also, the plate 113 is cam-shaped in that it has a first surface 117 which engages the roller 114, and it has a second surface 118 which also engages the roller 114 when the lift arm 74 is in its raised or upwardly pivoted position, as shown by the dot-dash lines of the plate and roller on the right in FIG. 6. Between surfaces 117 and 118, the plate 113 has a projection 119 which serves as an over-center projection or surface with respect to the pivotal action of the arm 74, as will be more fully described later.

Mower 57 is somewhat similarly raised by the same hydraulic means described. Thus an arm 121 is also connected to the pin 104 on the end of the ram 101, and the arm 121 is affixed to a sleeve 122 supported on a shaft 103 journaled in sleeves 124 and 126 suitably secured to the frame pieces 19 and 18, respectively. Thus the shaft 123 and the sleeve 122 rotate together, and the front end of the shaft 123 has a cam plate 127 which, like plate 113, engages the roller 128 on the other pivot arm 74 when the cam plate 127 is rotated upwardly to lift the mower.

At this time it will then also be understood that the plates 113 and 127 will retain the pivot arms 74 in the upward positions even when there is no hydraulic pressure in the cylinder 97. That is, the weight of the mowers and their attached parts including the attachment means or mounting described, will act downwardly on the respective plates 113 and 127 to prevent the plates from rotating back to their downward or original positions. This is therefore an over-center feature with respect to the plates 113 and 127, since the only way in which the mowers will be lowered will be through positive rotation of the plates 113 and 127 by the hydraulic means and linkage just described. In this regard, the shafts 108 and 123 are located with respect to the raised rollers 114 and 128 such that there is a substantially vertical alignment between the two in the mower fully raised position. Also, the rollers 114 and 128 are located adjacent the pivot pins 76 on each respective arm 74 so that only a slight or small action of raising the respective rollers 114 and 128 is required in order to obtain adequate upward movement of the outer ends of the pivot arms 74.

The same hydraulic cylinder 97 is also used to raise the rear mower 59. Thus linkage is connected between the cylinder 97 and the rear mower 49 so that only one cylinder 97 is required for raising all three mowers. To accomplish this, FIGS. 3 and 5 show that the rear end of the shaft 123 has a sleeve 129 affixed to the shaft 123 to rotate therewith. An arm 131 rotates with the sleeve 129, and the arm 131 is pivotally connected to a link 132 which also is pivotally connected to an arm 133 affixed to a sleeve 134 on a shaft 136. FIG. 4 shows the shaft 136 is rotatably mounted on a plate 137 on the frame 10, and the shaft 136 extends rearwardly along the frame and is suitably rotatably supported at its rear end on the frame 10, just as with regard to the support plate 137. A cam or pivotal plate 138 is pivotally mounted on the shaft 136 and is immediately in front of the unshown bearing support for the rear end of the shaft 136, and which bearing support is identical to the shown plate 137. The cam plate 138 is free to rotate on the shaft 136, and FIGS. 4 and 6 indicate how it is controlled in its rotation thereon by an arm 139 projecting from a sleeve 140 affixe to the shaft 136 to rotate therewith. Thus the plate 138 has screws 141 and 142 adjustably mounted on the plate by threading into ears 143 affixed to the plate 138. The screws are threadable into and out of the respective ears 143 and are in the arcuate path of movement of the finger or arm 139. Thus, from the shown downward position of the plate 138 as seen in FIG. 6, counter-clockwise rotation of the shaft 136 will cause the arm 139 to move into abutting contact with the screw 142. Additional rotational movement of the shaft 136 will pivot the plate 138 upwardly to the position shown in FIG. 4. In the FIG. 4 position, the plate 138 has engaged a roller 144 affixed to a pivot arm 146 mounted on a pin 147 on a tractor frame piece 148. The arm 146 is pivotally connected to a link 149 which is also pivotally connected to a bracket 151 on the mower pivot arm 74. Thus pivotal movement of the arm 146 will cause raising and lowering of the mower through the pivoting of the pivotal arm 74.

The cam plate 138 has a surface 152 which is arcuate to receive the roller 144 in the FIG. 4 position. The plate 138 also has a surface 153 which is arcuate to engage the roller 144 when the rear mower 59 is being raised or lowered. Intermediate the surfaces 152 and 153, the cam plate 138 has the projection 154 which is the over-center portion of the cam plate 138, serving the same purpose as the over-center portions 119 of the cam plates 113 and 127.

That is, the plate 138 in the FIG. 4 position will hold the rear mower 59 upwardly even though there is no torque applied to the shaft 136, and consequently there need be no pressure in the hydraulic cylinder 97. However, when it is desired to lower the mower 59, then rotation of the shaft 136 will rotate the plate 138 and release the roller 144 and permit the link 149 to lower the pivot arm 74, as desired.

The raising and lowering of the mowers is accomplished in a manner which causes the rear mower to be raised and lowered at a time subsequent to the raising and lowering of the front mowers 57 and 58. The reason for this is that when the machine is being used for mowing golf course greens, for instance, with the machine approaching the edge of the green to commence mowing, the tractor is moved onto the green and the cylinder 97 is actuated to have the front mowers 57 and 58 lowered to commence cutting at the very edge of the green. As the machine progresses onto the green in a non-stop movement, the linkage described and connecting the rear mower to the front mowers lowers the rear mower. However, because of the spacing of the screws 141 and 142, there is a time delay in lowering the rear mower, so it lowers onto the same ground line along which the front mowers commenced cutting. So there is what is termed a full-motion connection at the front mowers, and a lost-motion connection at the rear mower. Consequently, raising and lowering of the front mowers will cause a proportionate displacement of the linkage connected to the shaft 136, and it will cause a proportionate rotation of the shaft 136, but that rotation will not be effective on pivoting the plate 138 unless and until the arm 139 abuts the screw 141 or the screw 142 in the path of pivotal motion of the arm 139.

Further, the delayed or lost-motion connection is such that it is adjustable since the screws 141 and 142 are threadedly movable on their respective mounting ears 143 so that the angle defining the amount of lost motion is variable. Also, the linkage connection between the front and rear mowers, such as the link 132, is an adjustable threaded piece so that it too can be adjusted for controlling the timing and the lost-motion action between the front and rear mowers.

A spring 155 is connected between the frame piece 148 and the cam plate 138 and yieldingly urges the plate 138 upwardly when the arm 139 is free of the screw 142 and the plate 138 is pivoted beyond the position where the roller 144 is beyond the projection 154. Thus the spring 155 cushions the descent of the rear mower 59 when the mower approaches the ground in the lowering process.

FIG. 6 shows the positions of the cam plates, the linkage connecting the plates to the mowers, and all the attending parts, when the mowers are in the ground-riding or lowered position. It will then be noticed that the plates 113, 127, and 138 are all spaced below the cam followers or rollers 114, 128, and 144, respectively. This means that the mowers are free to follow any irregularities or undulations in the ground by having the pivot arms 74 pivot up and down without being impeded in the pivotal action by the cam plates.

The machine is hydraulically powered for both the traction drive and the operation of the three mowers shown. Thus FIG. 4 shows a traction drive pump 156 mounted on the rear of the tractor, and it is driven by the engine 46. A hydraulic pressure line 157 extends from the pump 156 and along the frame pieces 17, 16, and 14. FIG. 1 shows the line 157, and this line connects to a high speed valve 159 suitably mounted on the tractor and having the valve control 161 conveniently located for the operator. As shown in FIG. 10, and more fully described later, the valve 159 is connected with a valve 162 which is also suitably mounted on the tractor and has a control or lever 163 located conveniently for the operator for control of the valve 162 which is the traction valve actually controlling the power to the front traction wheels 11 and 12. Thus, FIG. 1 shows two hydraulic lines 164 and 166, and these lines connect with the traction valve 162 and they connect to hydraulic traction motors 165 and 167 shown in FIG. 3. These two motors are in driving relation to the respective front traction wheels 11 and 12, and thus the tractor is mobilized.

FIG. 1 shows a hood or cover 170 which is suitably mounted on the front end of the tractor to cover the hose connections and portions of the valves described. However, the hydraulic system is fully shown in FIG. 10 and will be described later in connection with FIG. 10.

FIG. 4 also shows three hydraulic pumps 168 having three hydraulic outlet lines 169. These lines also extend along the frame pieces 17, 16, and 14, and they are also shown in FIG. 1, and they connect to the valve 159, as shown in FIG. 10. Three hydraulic lines 171 are connected to the valve 159 and lead therefrom to another valve 175 on the left-hand side of the tractor in a position substantially directly opposite the valve 159, as seen in FIG. 3, for controlling operation of the mower reels 66. From the reel valve 175, two flexible hoses 172 and 173 connect to motors on mowers 57 and 58, respectively, as shown in FIG. 10. Also, hoses 174 and 176 connect to the mower motors and form return lines in the hydraulic system, as will be described in connection with FIG. 10. At this point, it should be noticed that the hoses 172, 173, 174, and 176 are flexible so that the mowers can move up and down to adjust to irregularities in the ground and so that they can be raised and lowered, as previously described. FIG. 1 also shows a flexible hose 177 which is connected to the reel valve and extends therefrom and below the operator's platform 23 and to the hydraulic motor 178 connected to the rear mower 59 for driving the reel of the rear mower, as the motors on the front mowers are also connected and arranged for driving their reels. A flexible hose 179 is connected to the motor 178 and serves as a hydraulic return line for the motor 178, as will be described more fully later.

Finally, FIG. 1 also shows the hydraulic cylinder 97 and its two hydraulic lines 102 connected to the cylinder. These lines extend from a valve suitably mounted on the left side of the tractor and immediately above the reel 182 so that the operator can control the ram valve 181 and they also show a foot pedal control 182 which is suitably movably mounted on the platform 123 for actuation by the left foot of the operator. A connecting rod 183 extends between the valve 181 and the foot pedal 182 so that the operator can control the ram valve 181 by means of his foot, and he need not take his hands off the handle bars or steering control 42 while operating the ram valve 181.

The drawings, including FIG. 2, show a hydraulic reservoir or tank 184 mounted at the front end of the tractor frame and directly over the frame piece 14. The tank is suitably enclosed and it is also in fluid-flow communication with the frame pieces 14, 16, and 17 by having an opening in the frame piece 14, such as the shown opening 186 in FIGS. 5 and 6, in flow communication with an opening in the tank bottom. Further, the frame pieces 14, 16, and 17 are hollow pieces and are welded together to be fluid tight but they permit fluid flow between all of these three pieces.

FIG. 1 shows the motor 178 mounted on one end of the mower 59, and a counter-balance spring 202 is connected with the mower 59 to counter balance the weight of the motor 178. FIG. 4 shows that the spring is connected between a fixed upright arm 203, on the end of arm 100, and an arm 204 which is on a collar 206 at the rear end of the shaft 78 shown in FIG. 7, for instance. Thus the collar 206 is secured to the shaft 78 to rotate therewith, and a key is shown for securing the pieces together, and the arm 204 is also shown welded to the collar 206. Further, a set screw 207 holds the collar 206 from moving off the end of the shaft 78. Thus the spring 202 is a tension spring and it tends to rotate the arm 204, and therefore the shaft 78, in a clockwise direction relative to the front end of the shaft 78 to thereby counter the weight of the motor 178 on the rear mower 59.

The front mowers 57 and 58 have their driving hydraulic motors on the inner ends thereof, and FIGS. 1 and 6 show a counter-balancing spring 208 is applied through a rod 209 and a fixed arm 211 and an arm 212 fixed to the front mower shaft 78, in the manner that the arm 204 is fixed with respect to the rear mower. Thus the spring 208 is a compression spring, and it tends to push on the arm 212 to rotate the shaft 78 in a direction to counter the weight of the front motors. The rod 209 slidably extends through a sleeve 210 on the arm 212, and the spring 208 is secured by a pin 213 extending through the rod 209 in adjustably positioned holes 214 in the rod 209. Thus the tension on the springs 208 can be altered as needed and desired.

The companion U.S. patent application Ser. No. 768,648, filed Oct. 18, 1969, shows and describes this mowing machine.

DETAILED DESCRIPTION OF THE EMBODIMENT SHOW IN U.S. PAT. NO. 3,429,110 AND FIGS. 11–17 HEREIN

Generally, the gang mower of this invention has a tractor unit, generally designated 10' and a mower unit generally designated 11'. The tractor unit is further described as including a frame, generally designated 12', and the mower unit is also described as including a frame, generally designated 13'. The tractor unit includes the power plant or prime mover, which is shown to be a gasoline engine assembly, generally designated 14' in FIG. 12, and it includes two wide ground wheels 16' and two narrower caster wheels 17', all four of which are rotatably mounted as a part of the tractor unit 10'. The wide wheels 16' basically support the entire gang mower on the ground, and they do so with a minimum of pressure so that the impression on the ground is a minimum and the lawn is therefore not depressed.

The tractor frame 12' includes a generally rectangularly disposed piece 18' which extends rearwardly into handles 19' which of course the operator may grasp to control the direction of the gang mower. This may be either a walk behind type of mower or a sulkie or other seat (not shown) may be attached to the mower unit for riding if desired. The tractor frame further includes the lower carriage or frame piece 21' which is welded or otherwise suitably secured to the frame piece 18' at their points of apparent contact. Also, laterally extending frame pieces 22' support sleeves 23' which in turn rotatably support axles 24' in the vertical direction for the castering wheels 17'. Of course the prime mover or engine 14' is suitably mounted on the tractor frame 10', as are the wheels 16' and 17', and frame cross pieces 26' and 27' and engine mounting members 28', are all provided for mounting the engine 14' as shown and mentioned.

Figure 11:
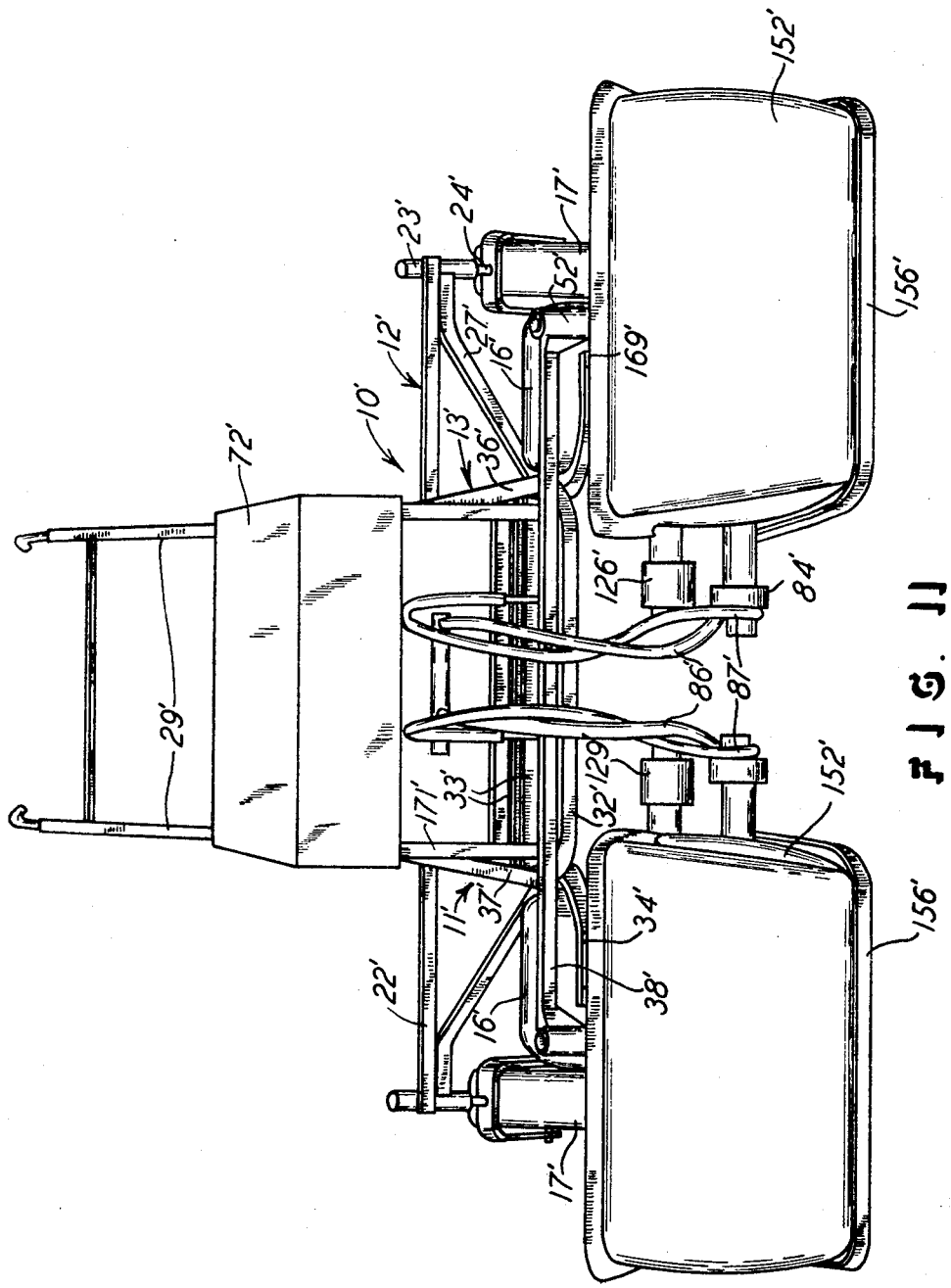
FIG. 11 is a front perspective view of certain parts of another embodiment of this invention.
Figure 12:
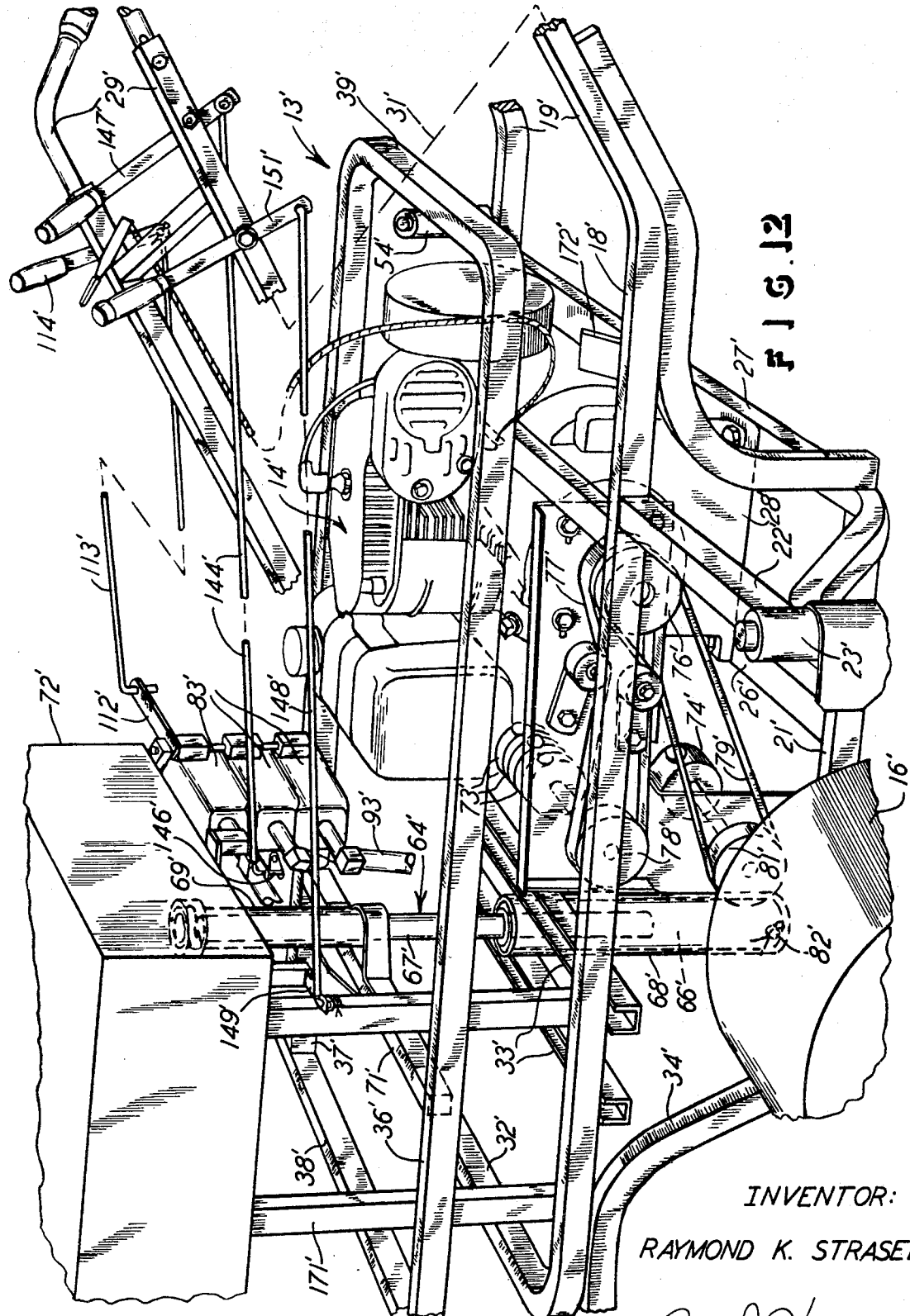
FIG. 12 is an enlarged side perspective view of the embodiment shown in FIG. 11, but showing the central portion thereof only.

FIGS. 11 and 12 further show the handles 29' extending rearwardly on the tractor frame 10', and the dotted line 31' in FIG. 12 shows the actual location of the rear handle 29' with respect to the handle frame section 19' previously described.

Thus the tractor frame 18' is generally rectangular in plan view, and it includes the side pieces connected by the front piece indicated 32', and the three sections are disposed in a common horizontal plane. The rearwardly extending sections 19' indicate the termination of the horizontal portion of the frame 18'. Cross pieces 33' are connected between the sides of the frame 18', and an additional frame piece 34' extends at the forward end of the tractor frame 12', as shown in FIGS. 11 and 12.

FIGS. 11 through 15 show the mower unit 11' which is mounted on the tractor unit 10'. Here it will be noted that the mower frame 13' is also of a rectangular configuration in plan view, and it includes the side frame pieces 36' and 37' and the front piece 38' and the rear piece 39'. Thus the mower frame 13' is of the same planular shape as the tractor frame 18', and in fact it rides directly on the tractor frame in the mowing or lowered position of the mower frame, as shown in FIG. 11.

FIG. 13 shows the location of three mower reels 41', 42', and 43', all of which are articularly mounted on the mower frame 13'. The reels are shown in dot-dash lines in FIG. 13, and they are shown in dot-dash circles in FIG. 14. Further, the reels are shown to be supported between mower side plates 44' which are movably supported on the ground line designated 46' in FIG. 14. The support is by means of a forward roller 47' and a rearward roller 48', both of which extend across the width of the mowers and between the plates 44'. Mower supporting forks 49' are connected to the plates 44' by means of pins 51', or the like, so that the mowers may be secured to the mower or carrier frame 13'. The mower forks 49' are pivotally attached to the mower frame 13' through the upright shaft 52' which is connected to the fork 49'. A sleeve 53' depends from the mower frame front member 38' to rotatably receive the shaft 52' so that the mowers can of course pivot or rotate about the axis of the shaft 52' in steering the mowers in accordance with the steering of the entire unit. That is, if the entire unit is turned to the right, then the right hand ends of the mowers 41', 42', and 43', will move rearwardly while the left hand ends will move forwardly to turn about the turning center of the entire unit. This is a natural maneuver since the sleeves 53' are located forwardly on the mower unit which are therefore in trailing and tracking position. Of course this mounting is true of the two front mowers 41' and 42', and a similar sleeve 54' and vertical pin 56' are provided for the rear mower 43', and the sleeve 54' is secured to the mower frame piece 39', as seen in FIG. 12, as well as in FIG. 13 and FIG. 14. It will be further understood that the shafts or pins 52' are attached to the affixed sleeves 53' in a suitable manner so that upon raising the mower frame 13', the shafts 52' and 54' will also be raised and thereby raise the mower forks 49' and the entire mowers.

The forks 49' include uprightly disposed side members 57' which have slots 58' for receiving the pins 51'. It will therefore be apparent that both ends of the mowers can move up and down within the limits of the slots 58' and thus adjust themselves to the contour of the ground being mowed. Another important feature of this arrangement is that the mower frame 13' is resting on the tractor frame 12', but the mower frame 13' is not placing its weight on the mower units themselves. That is, the mower units are resting directly on the ground but do not support any part of the framing described such as the mower frame 13' and the mower forks 49'.

Further, the mowers cannot only move vertically in a lateral plane with respect to the direction of the unit, but they can move vertically with respect to the fore-and-aft plane. Thus the mower units may actually pivot about the axis of the pins or bolts 51', and such pivotal movement is restricted by an arm 59' affixed to the forks 49' and extending rearwardly to connect to the mower cross tube 61' through a bolt or pin 62'. The arms 59' have uprightly disposed slots 63' which slidably receive the pin 62' so that the latter can be affixed to the cross tube 61', which in turn is connected to the mower side plates 44', and the rear end of the mowers can move up and down within the limits of the slots 63'.

Other than having the mower frame 13' rest upon the tractor frame 12', the connection between the two frames is a hydraulic ram 64' consisting of a cylinder 66' and a rod 67'. The cylinder 66' is disposed in a sleeve 68' affixed between the tractor cross frame pieces 33', as shown in FIG. 12. Also, a cylinder 69' receives the upper end of the piston rod 67', and the cylinder 69' is affixed to a cross frame piece 71' extending and connected to the sides 36' and 37' of the mower frame 13'. Through this means, the mower frame retains its fore-and-aft position with respect to the tractor frame, and the mower frame 13' is raised and lowered between the FIG. 11 position and the FIG. 12 position. These are the mowing and transport positions respectively. FIGS. 11 and 12 also show a hood or cover 72' which includes the reservoir for the hydraulic system of which the ram 64' is a part. The hydraulic system also has three pumps 73' and one pump 74', all of which are powered by the prime mover 14' as indicated. Thus a drive pulley 76' is rotated by the engine 14', and a belt 77' extends to a pulley 78' which is connected to the three pumps 73' to drive the latter. Also, a belt 79' extends from the pulley 76' to the pulley 81' which is connected to the pump 74' to drive the latter. The three pumps 73' drive motors in the three mowers 41', 42', and 43', and the pump 74' drives the two motors in the traction wheels 16', and it also pressurizes the ram cylinder 66'. The ram cylinder 66' is secured in the mounting sleeve 68' by means of a pin 82' so that the cylinder can be slightly adjustable and pivotal therein to accommodate the mounting described for the connection between the two frames of the gang unit.

Of course suitable hydraulic lines or hoses extend between the pumps 73' and 74' and valves, such as three valves 83' for the pumps 73' and the reel motors 84', as indicated in FIGS. 11 and 16, in addition to FIG. 12.

FIG. 11 shows inlet and outlet hoses, 86' and 87', connected in pairs to the indicated reel motors 84' for the pressure and return lines with respect to the motors 84'. Thus, all of the mower reels are driven in unison as desired so that the same cutting is effected by each of the reels.

FIG. 16 schematically indicates the three reel pumps 73' with hose pressure lines 88', 89', and 91', leading respectively into the three reel valves 83'. Pressure lines 93', 94', and 96' are shown connected to the valves 83' with each leading into the dotted rectangles designating the respective reel motors 84'. A reservoir tank return is designated at 97', and return lines 98', 99', and 101', are shown connected from the motors 84' to the return tank 97'. Three return lines 102', 103', and 104', are shown connected to a header 106' and to the three valves 83'. These are available for return of fluid when the reels are not operating. Also, pump suction lines 108' and 109' are connected between the pump 73' and the tank outlet header designated 111'. Thus the hydraulic circuit for driving the three reel motors 84' is completed.

A common valve control arm 112' and rod 113' are shown in FIG. 12 to be connected through a control lever 114' and mounted on the handle 29'. The operator therefore has control over the reel valves 83' to run them all in unison as desired.

FIG. 17 shows the hydraulic system for the traction wheels 16' and the ram 64'. Here it will be noted that the pump is shown at 74', and has a pressure line or hose 116' leading to one side of the four-way traction valve, and this side is designated 117'. The traction valve has what may be designated two other sides 118' and 119', and they have hoses 121' and 122' respectively connected thereto and leading into a T 123' and a T 124'. One side of each of the T's 123' and 124' leads into the traction motor 126', on one side of the gang unit, and the other side of each of the T's 123' and 124' has hoses 127' and 128' respectively connected thereto for leading into the traction motor designated 129', which is the motor on the other side of the unit. With the double leads into each of the motors 126' and 129', the motors may be run either forward or reverse for forward and reverse movement of the tractor. With the valve set to eject fluid at 118', the motos 126' and 129' are run forward. With fluid outlet at 119', the motors are in reverse.

A line or hose 131' extends from a fourth or neutral side designated 132' of the traction valve to the side designated 136' of the ram valve. This brings the hydraulic fluid to the ram valve. A pressure hose 134' extends from a side 133', of the ram valve, to the ram cylinder 66', as indicated. The ram valve also has a return line hose 137' extending from the valve side 135' to a tank return designated 138'. The traction motors 126' and 129' also have a return bleed hose 139' connected thereto, and the hose 139' is connected to a hose 141' which extends to the tank return 138'. Finally, a hose 142' connects to a tank outlet 143' and to the pump 74' for supplying the pump with hydraulic fluid. The pumps 73' and 74' are synchronized by the arrangement and drive described so that the forward speed of the gang unit through the traction wheels 16' is synchronized with the speed of rotation of the mower reels, for the desired mowing action.

The tractor frame sections 34' carry forks 169' which extend above the mower forks 49' such that upon raising the mower frame 13', the tractor forks 169' engage the mower forks 49' to secure the latter in an oriented position for transport. This retains the mowers against swinging and getting out of alignment in transport so that a restricted width of passageway may be negotiated with the mower unit, and there will be no damage to the mowers since they will be held firmly by the forks 169'.

FIG. 12 shows upright members 171', which are fixed to the tractor frame 18', extending above the frames to support the reservoir 72' and to serve as a guide for the up and down movement of the mower frame 13'. Also, a piece 172' is attached to the tractor frame 18' at the rearward portion thereof and at each side thereof, and the piece 172' is angled as shown to guide the mower frame 13' when the latter is lowered onto the frame 18'. It will also of course be understood that the hoses described, such as the hoses 86' and 87', have sufficient length or slack so that the turning or steering of the mowers may be accomplished, and also the raising and lowering of the mowers and the pivoting in all directions may be accomplished. Also, the two hoses 86' and the two hoses 87' are represented by the two lines 94' and 96' and 98' and 99' lines.

The connection between the mower frame and the three mowers themselves, that is, the pins 51' and slots 58' on the forks 49', is a lost motion connection.

Also, the ram 64' is located at the center of gravity of the carrier frame 13', all the mowers and catchers and other attachments to the frame 13', so the entire mass is raised evenly.

Wheels 16' are oversized or of a substantial width to give only a minimum of ground pressure and turf impression. Wheels 17' are only balancing and steering wheels, as the wheels 16' are centrally located on the tractor unit.

What is claimed is:

1. In a lift means for tractor-mounted lawn mowers, a tractor, a lift arm pivotally mounted at one end on said tractor, a lawn mower mounted on the other end of said lift arm, connecting means mounted on said tractor and being movable up and down on said tractor and being operatively connected to said lift arm for raising and lowering said lawn mower by pivoting said lift arm in accordance with said up-and-down movement of said connecting means, a control on said tractor and connected with said connecting means for selective up-and-down movement of the latter, the improvement comprising said connecting means including a plate uprightly pivotally mounted at one end on said tractor and being pivoted along with said up-and-down movement, and said plate being disposed below said lift arm and extending into operative connection with said lift arm at the end of said plate opposite said one end upon upward pivoting of said plate.

2. The subject matter of claim 1, wherein said plate is pivoted downwardly to a location spaced from said lift arm for free up-and-down pivotal action of said lift arm when said mower is in a lowered ground-riding position.

3. The subject matter of claim 1, wherein said lift arm includes an abutment surface in the path of upward pivotal movement of said plate for engagement by said plate in the upward pivotal action of said lift arm, said plate having a first surface for initial engagement of said abutment surface and lifting of said lift arm and having a second surface angularly disposed with respect to said first surface for final engagement of said abutment surface and for holding said lift arm in a raised position.

4. The subject matter of claim 3, wherein said plate has a projection extending continuously between said first and said second surfaces for raising said lift arm into an over-center position and thereby secure said lift arm against downward pivotal action induced by the weight of said lift arm.

5. The subject matter of claim 4, wherein the pivot axis of said plate and said abutment surface on said lift arm are arranged and located to be at least approximately on a common upright plane when said lift arm is being held in the raised position, so the weight of said lift arm is at least approximately vertically downward relative to said plate axis.

6. The subject matter of claim 5, wherein said connecting means includes linkage connected to said plate for rotating the latter, and said linkage is free of the force exerted by the weight of said lift arm when the latter is being held in the raised position, and said linkage is affixed with said plate for pivoting the latter beyond said over-center position in the raising and lowering of said lift arm.

7. The subject matter of claim 1, wherein said abutment surface on said lift arm is located less than one-half the length of said lift arm from the pivot axis of said lift arm for producing the desired pivotal movement of said lift arm with a minimum movement of said connecting means.

8. The subject matter of claim 1, including a roller on said lift arm and disposed in the path of pivot of said plate, and said plate having an edge engageable with said roller for raising said lift arm.

9. In a lift means for tractor-mounted lawn mowers, a tractor, a plurality of mowers, mounting means connected intermediate said tractor and said mowers for liftably mounting some of said mowers forwardly on said tractor and other of said mowers rearwardly on said tractor, lift means connected between said tractor and said mounting means for raising and lowering said mowers, the improvement comprising said lift means being directly connected to said mounting means of said forwardly mounted mowers, a lost-motion connection operatively connected between said lift means and said mounting means of said rearwardly mounted mowers for raising and lowering said rearwardly mounted mowers at a time subsequent to the respective raising and lowering of said forwardly mounted mowers.

10. The subject matter of claim 9, wherein said lift means includes a single hydraulic cylinder operatively connected to said tractor for raising and lowering all said mowers.

11. The subject matter of claim 9, including a spring operatively connected between said tractor and said rearwardly mounted mowers and arranged to yieldingly urge the latter into the raised position to cushion the lowering of said rearwardly mounted mowers onto the ground.

12. The subject matter of claim 9, wherein said lift means and said lost-motion connection are interconnected and the only elements required for both raising and lowering said mowers are operative in reverse for said raising and lowering.

13. The subject matter of claim 9, wherein said lost-motion connection includes adjustment means for increasing and decreasing the amount of time said rearwardly mounted mowers can be raised and lowered relative to when said forwardly mounted mowers are raised and lowered.

14. The subject matter of claim 9, including an engine on said tractor, hydraulic drive means in said tractor and being in direct drive with said engine for mobilizing said tractor, and said lift means including a hydraulic cylinder in direct drive with said engine and powered therefrom in a fixed ratio to the mobilizing speed of said tractor for raising and lowering said rearwardly mounted mower at a time in fixed relation to the speed of said tractor.

References Cited

UNITED STATES PATENTS

| | | | |
|---|---|---|---|
| 2,659,190 | 11/1953 | Imbt | 56—7 |
| 3,058,281 | 10/1962 | Lewis | 56—7 |
| 3,177,638 | 4/1965 | Johnson | 56—7 |
| 3,248,864 | 5/1966 | Barth | 56—26 |
| 3,429,109 | 2/1969 | Heth et al. | 56—7 |

ROBERT PESHOCK, Primary Examiner

J. A. OLIFF, Assistant Examiner